Patented Dec. 1, 1931

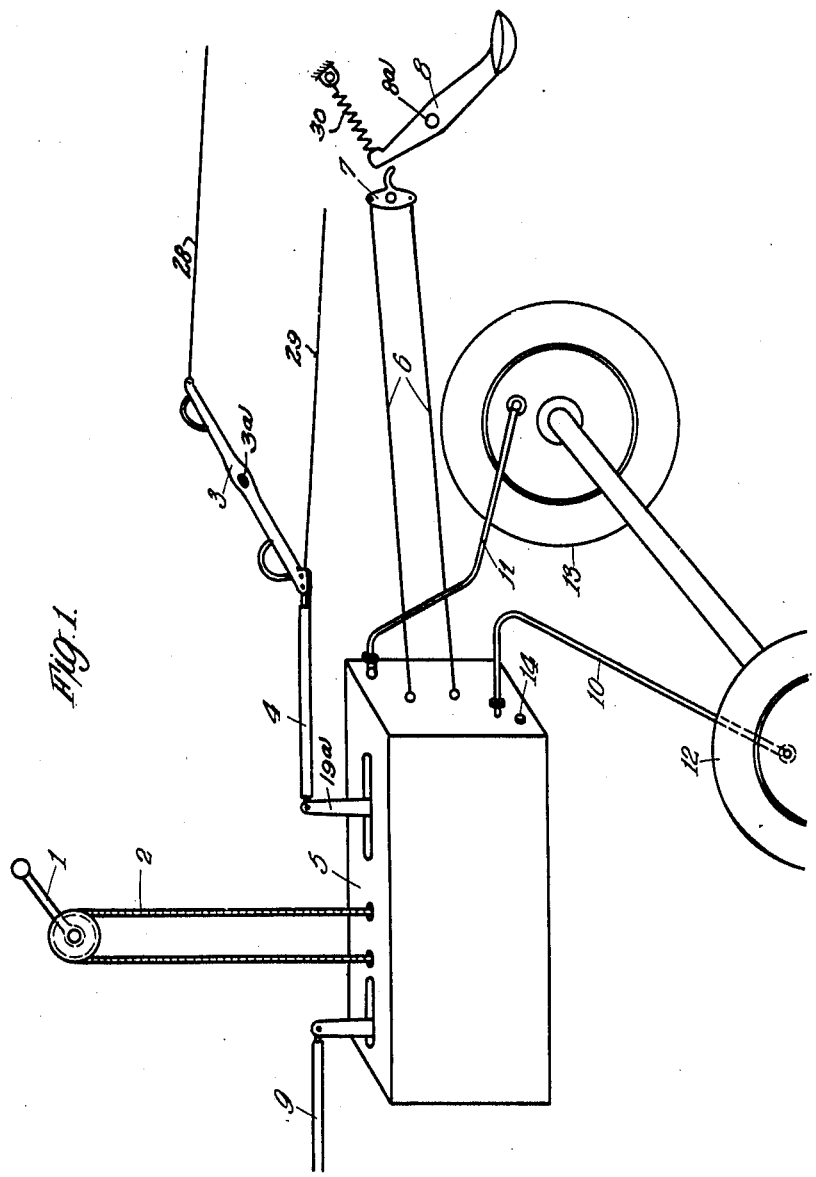

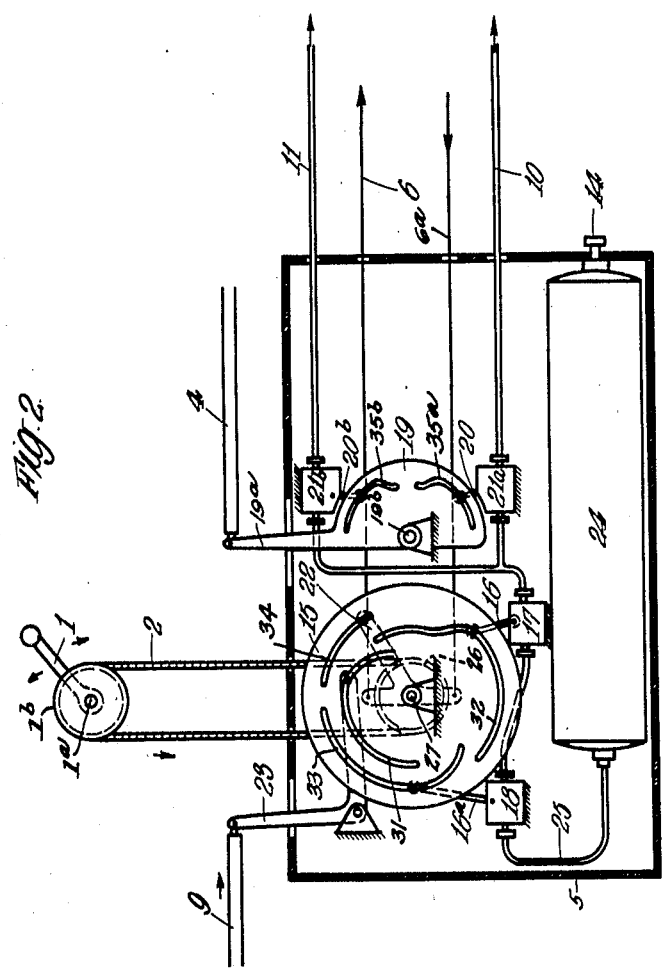

1,834,859

UNITED STATES PATENT OFFICE

FRANZ MICHAEL, OF BAUMSCHULENWEG-BERLIN, AND MANFRED GRABARSE, OF ADLERSHOF-BERLIN, GERMANY, ASSIGNORS TO KNORR-BREMSE AKTIENGESELLSCHAFT, OF BERLIN, GERMANY, A CORPORATION OF GERMANY

CONTROL GEAR FOR AIRCRAFT

Application filed July 31, 1930, Serial No. 472,082, and in Germany August 24, 1929.

The increase in size of aircraft and the improvement in their running properties, in particular where stern wheels are used instead of sliding spurs or tail skids, has produced such an increase in the run-out that the use of wheel brakes is necessary. While in small aircraft a mechanically actuated brake is sufficient, it is preferable in larger aircraft to actuate the brake device by means of compressed air. As compared with the brake devices of other vehicles, with aircraft great demands are placed upon the means of actuation. Thus, in addition to the obvious requirement of being able to apply or release the brakes gradually, it is necessary that a one-sided braking, possibly with coupling to the lateral steering, should be feasible. This requirement has for its object in the main to improve the running properties of the aircraft on the ground, running in curves, and the like, and in addition to offer the possibility of preventing damage to the aircraft when landing owing to one-sided braking. The danger of the aircraft turning over in consequence of an application of the brakes which is too strong and sudden renders it desirable to provide a coupling with the skid, so that the brake is suddenly cut off when the skid leaves the ground. It is also desirable to couple the brake device with the service levers at the pilot's seat in such manner as to ensure against errors in working such as an attempt to start the engine with the brakes applied. These requirements make a more complete control necessary than with the brakes of other vehicles. As there are already a number of subsidiary devices and instruments in the aircraft for the supervision of the engine and the aircraft, the decentralized arrangement of which owing to the many necessary fittings and mountings involves considerable weight, and which also distract the attention of the pilot, it is desirable that the brake devices for aircraft should have a minimum number of additional parts, and that the control thereof by the pilot should be effected very simply and mistakes automatically prevented.

The present invention has arisen from these considerations. Its chief object is to provide a control gear for aircraft brake devices, in which all valves, cocks and their driving gear, by means of cam discs, toothed wheels and levers, are combined with the air reservoir into a fixed aggregate. The control gear is independent of the character of construction of the aircraft and of its size, and is easily fitted into the aircraft so as to be capable of removal. Only a few cords, chains, or connecting rods lead to the control gear for the direct working of the cam discs, and pipes lead from the gear to the wheels. The advantage of this arrangement is that in addition to the combination in a manner suitable to supervision of all the delicate parts (for example, valves) there is also given the possibility of obtaining a firm seating, free of play, for the separate parts, the fitting up and inspection being easy. The arrangement of the control gear so that it can be easily taken out, facilitates examination of the apparatus for tightness of joints and correct play and timing which can be carried out satisfactorily and rapidly away from the aircraft without additional apparatus, while at the same time the adjustment of valves, cocks, etc., is facilitated.

In the accompanying drawings or diagrams, Figure 1 is a perspective view of the control gear, and Figure 2 is a vertical section illustrating the operating mechanism.

The lever 1 at the pilot's seat is connected with the control gear by a cord 2, and operates the pressure regulating valve of the brake. Instead of a cord, chains or connecting rods can be used here, as well as in other parts of the mechanism in the description of which cords are mentioned. From a lever 3 of the side control, a connecting rod 4 (or cord) also runs to the control gear 5, which enables the application of the brake to one of the wheels to be interrupted for the purpose of one-sided braking. Other actuation cords can also be connected to the control gear 5; thus, for example, the cord 6 connected to the skid striking lever or trigger 7 gives the possibility of cutting out the whole braking device at a determined deflection of the skid 8. In addition, a coupling of the control gear with an engine controlling rod may be provided by a connecting rod 9. The two pipes 10 and 11 run from the control gear to the two brake wheels 12 and 13. The compressed air reservoir 24 in the control set is filled through the filling valve 14.

Figure 2 illustrates means for actuating the valves by rotary cams. On a shaft or stud 1a, supported in a suitable bearing pillar (not shown) extending upwardly from the housing 5, is mounted a pulley 1b, rotatable by means of the handle 1. On a shaft 27 in the housing is secured a pulley 26, adapted to be driven from the pulley 1b by a flexible driving connection 2, and also secured on this shaft 27 is a disc 15 having therein cam grooves 31, 32, 33, and a concentric groove 34. A three-armed lever 22 is free to turn on the shaft 27, the longest arm of the said lever carrying a pin movable in the said groove 34. To the other two arms of this lever 22 are attached connections 6, 6a which at their other ends are attached to a trigger 7 (Figure 1) operable by the air craft skid 8, which latter is influenced by a tension spring 30 to turn about its pivot 8a.

A pedal lever 3 (Figure 1) pivoted at 3a and having connections 28 and 29 with the side rudders (not shown) of the aircraft, has also a connection 4 with an upwardly extending arm 19a of a cam 19 (Figure 2) pivoted at 19b and having therein grooves 35a and 35b.

The communication between the compressed air reservoir 24 and the pipes 10 and 11 leading to the wheel brakes is controlled by a regulating valve 18, a supplementary valve 17 which takes the place of a stopcock, and intercepting valves 21a and 21b on the respective pipes 10 and 11. The opening of the valve 17 is controlled by a lever 16 operatively engaged in the groove 32 in the disc 15, and the opening of the valve 18 is controlled by a lever 16a operatively engaged in the groove 33 in the said disc. The opening of the intercepting valves 21a and 21b is controlled by levers 20a and 20b respectively operatively engaged in the grooves 35a and 35b of the cam 19. The valve 17 has only two positions, that is, fully open and fully closed, but the regulating valve 18 is adjustable in known manner to various positions, each of which corresponds to a definite brake cylinder pressure; the purpose of the valve 17 is to prevent the passage of air in the event of the valve 18 becoming leaky. A single valve may be used instead of the two valves 17 and 18.

A bell crank lever 23 carries a pin operatively engaged in the groove 31, and is pivotally connected with a rod 9 which is adapted to release or to place in operation the coupling between the aircraft propeller and the motor (not shown).

The gear is illustrated in Figure 2 in the neutral position, or position of rest, the valves 17 and 18 being closed, both the valves 21a and 21b open, the rod 9 in the position in which the motor is shut off or running idly. When starting up the aircraft the handle 1 is moved to the left, that is, counter-clockwise, viewing the drawing whereby an angular movement is imparted to the disc 15 so that the lever 23 is caused by the nonconcentric part of the groove 31 to draw the rod 9 towards the right hand side, that is, in the direction indicated by the arrow, and the motor is put in operation. When the skid 8 (Figure 1) is off the ground, the cord 6a is caused by the trigger 7 to rock the lever 22 so that the pin on the long arm of the said lever is at the upper or left hand end of the slot 34, and thus clockwise movement of the disc to apply the brakes is prevented. When on landing the aircraft touches the ground and the skid 8 is thereby pressed up, against the resistance of the spring 30, the cord 6 rocks the lever 22 to the right, permitting the application of the brakes. The handle 1 is then turned down to the right, whereby the clockwise rotation of the disc 15 the rod 9 is restored to the idle position, the lever 16 is drawn into the non-centric part of the groove 32 to open fully the valve 17, then the lever 16a is drawn into the non-concentric part of the groove 33 to open the regulating valve 18 the extent of opening being dependent on the extent of the clockwise movement of the handle 1 so far as may be desired, and as the valves 21a and 21b remain open, the brakes are applied, but will be released by the action of the lever 22 if the skid rises off the ground.

If the machine on landing tends to swerve, or if the pilot wishes to run on a curve, then by means of a deflection of the side rudders, the rod 4 is actuated, whereby the cam 19 is rotated, and one of the two intercepting valves releases the brake pressure at one wheel, while the other intercepting valve does not alter its position, and brake pressure still prevails on the inner brake wheel when running round the curve. For example, if by traction on the rod 4 the cam 19 is rocked in a clockwise direction the lever 20a passes into the non-concentric part of the groove 35a and closes the valve 21a, while the valve 21b remains open and compressed air continues to exert a braking action through the pipe 11 on the wheel 13.

When the motor is running with full fuel supply, the application of the brakes is prevented by the coupling of the cam disc 15 through the lever 23 with the connecting rod 9, as the lever 1 cannot be actuated for putting on the brake, without the motor being at the same time stopped or switched on to the position of running without load.

What we claim and desire to secure by Letters Patent of the United States is:—

1. In an aircraft control gear combined into an aggregate detachable from the aircraft and independent of the construction thereof, said control gear comprising a compressed air reservoir to supply pipes connected with landing wheel brakes, valves to control said air supply, means for operating said valves connected with an operating lever at the pilot's seat for brake pressure regulation, with the side control for one-sided braking, and with the skid and motor to prevent faults in operation.

2. Control gear as in claim 1, wherein the valves are directly actuated by cams, each cam when set in rotation being only operative at a definite angle of deflection to actuate a valve connected therewith.

3. Control gear as in claim 1, wherein a cam adapted to actuate the brake pressure regulating valve is connected with the motor, whereby rotation of the cam in one direction permits operation of the motor and prevents application of the brakes, while its rotation in the opposite direction prevents operation of the motor and enables the brakes to be applied.

4. In an aircraft, landing wheels, brakes applicable to said wheels, a source of compressed air, pipes to lead air under pressure from said source to said brakes, valves to control the passage of air through said pipes, a rotary disc having cam grooves to control said valves, a lever adapted to rotate said disc into the position in which the said valves are closed, a pivoted tail skid, a trigger adapted to be actuated by said skid on the latter's rising off the ground and connections from said trigger to said lever operative to rotate said disc to close said valves on said rising of the skid.

5. In an aircraft, a housing for the brake control gear, said housing containing a compressed air reservoir and valves controlling the passage of air from said reservoir to the landing wheel brakes, said housing also containing a cam disc to control the opening and closing of said valves, and connections from said disc to the aircraft engine to prevent opening of said valves while the engine is operative.

6. In the aircraft, landing wheels, brakes applicable to said wheels, a source of compressed air, pipes to lead air under pressure from said source to said brakes, a valve to control the passage of air through said pipes, a rotatable member having cam grooves to control said valve, said member having also a concentric groove, a rocking lever engaging said concentric groove, a pivoted tail skid, a trigger adapted to be actuated by said skid on the latter's rising off the ground, connections from said trigger to said rocking lever to place said lever in a position relative to said concentric groove in which it prevents said member from rotating in the direction to open said valve on said rising of the skid.

7. In an aircraft, landing wheels, brakes applicable to said wheels, a source of compressed air, pipes to lead air under pressure from said source to said brakes, a regulating valve to control the passage of air through said pipes, a hand lever, a rotatable member operable by said lever, said member adapted when turned in one direction to effect the opening of said valve, and when turned in the reverse direction to effect the driving engagement of the motor coupling.

8. In an aircraft, landing wheels, brakes applicable to said wheels, a source of compressed air, pipes to lead air under pressure from said source to said brakes, a regulating valve to control the passage of air through said pipes, a rotatable member having oppositely curved cam grooves, a connection to the motor coupling guided in one of said grooves, a connection to said regulating valve guided in the other of said grooves, means for rotating said member in either direction, whereby a movement thereof in one direction effects the driving engagement of the motor coupling and closure of the said valve, a movement of said member in the opposite direction effecting the disengagement of the motor coupling and opening of the valve.

9. In an aircraft, landing wheels, brakes applicable to said wheels, a source of compressed air, pipes to lead air under pressure from said source to said brakes, a regulating valve to control the passage of air through said pipes, a hand lever, a rotatable member operable by said lever, said member adapted when turned in one direction to effect the opening of said valve, connections with the aircraft skid and the motor coupling to automatically prevent said member being turned in the said direction when either the skid is raised or the motor is in driving engagement.

FRANZ MICHAEL.
MANFRED GRABARSE.